`US006647313B1`

(12) United States Patent
Holman

(10) Patent No.: US 6,647,313 B1
(45) Date of Patent: Nov. 11, 2003

(54) INSULATION CUTTING SYSTEMS AND METHODS

(75) Inventor: Allen Holman, Knoxville, TN (US)

(73) Assignee: Quickpen International, Inc., Englewood, CO (US)

( * ) Notice: Subject to any disclaimer, the term of this patent is extended or adjusted under 35 U.S.C. 154(b) by 0 days.

(21) Appl. No.: 10/033,706

(22) Filed: Dec. 27, 2001

(51) Int. Cl.[7] ............................................... G06F 19/00
(52) U.S. Cl. .................................................. 700/171
(58) Field of Search ........................ 700/115–117, 171, 700/90, 95

(56) References Cited

U.S. PATENT DOCUMENTS

| | | | | | |
|---|---|---|---|---|---|
| 4,551,810 A | * | 11/1985 | Levine | ........................ | 700/182 |
| 4,847,778 A | * | 7/1989 | Daley | ......................... | 700/180 |
| 5,920,849 A | * | 7/1999 | Broughton et al. | ......... | 705/400 |
| 6,222,155 B1 | * | 4/2001 | Blackmon et al. | ..... | 219/121.39 |

* cited by examiner

Primary Examiner—Leo Picard
Assistant Examiner—Ryan A Jarrett
(74) Attorney, Agent, or Firm—Townsend, Townsend & Crew LLP

(57) ABSTRACT

A method for cutting insulation is provided. The method includes assigning identifications to metal blanks in a batch of metal blanks that have been processed. The metal blanks are then fabricated where they may be rolled, bent, and have seams and joints applied. Once fabrication is completed for one or more metal blanks and the metal blanks are ready for insulation, one or more identification numbers corresponding to the ready metal blanks are entered into an insulation cutting system. Insulation blanks corresponding to the identifications are then cut. The cut insulation blanks correspond to the ready metal blanks.

35 Claims, 1 Drawing Sheet

INSULATION CUTTING SYSTEMS AND METHODS

BACKGROUND OF THE INVENTION

The present invention generally relates to duct work, and more specifically, to a system and method for cutting parts for the duct work on demand.

In general, insulation for duct work is cut when metal blanks are generated for fittings for duct systems. Metal blanks for fittings are typically designed using Computer Aided Design (CAD) software. When the designs of the metal blanks have been finished, insulation blanks for the fittings are also generated using the same or similar software. The designs are then sent to a system for cutting the metal and insulation blanks where the metal blanks and insulation blanks are each optimized in separate batches. Once optimized, the metal blanks and insulation blanks are processed or cut by machines. Typically, insulation blanks are cut from a large piece of insulation on a table. The insulation blanks are different in size and shape and are arranged on the table so as little insulation as possible is wasted.

After the insulation and metal blanks are cut, the metal blanks are then processed through a shop where they are rolled, bent, and have seams and joints applied. After processing, the metal blanks need to be reunited with the previously cut insulation blanks. Typically, a user searches through a pile of pre-cut insulation to find the insulation blanks that match the processed metal blanks. Searching for the pre-cut insulation blanks takes time and thus, expensive labor costs are incurred because of the searching.

BRIEF SUMMARY OF THE INVENTION

In one embodiment of the present invention, a method for cutting insulation is provided. The method includes assigning identifications to metal blanks in a batch of metal blanks that have been processed. The metal blanks are then fabricated where they may be rolled, bent, and have seams and joints applied. Once fabrication is completed for one or more metal blanks and the metal blanks are ready for insulation, one or more identification numbers corresponding to the ready metal blanks are entered into an insulation cutting system. Insulation blanks corresponding to the identifications are then cut. The cut insulation blanks correspond to the ready metal blanks.

In another embodiment, the method for cutting insulation may be used to produce other parts for the metal blanks.

In one embodiment, a method for cutting insulation for fabricated metal blanks using an insulation cutting system, where the fabricated metal blanks are processed from a batch of metal blanks is provided. The method comprises: assigning one or more identifiers to metal blanks in the batch of metal blanks; when insulation is needed for one or more fabricated metal blanks, providing the identifiers of the metal blanks corresponding to the one or more fabricated metal blanks to the insulation cutting system; and cutting one or more insulation blanks for the identifiers of the metal blanks, the one or more insulation blanks corresponding to the one or more fabricated metal blanks.

A further understanding of the major advantages of the invention herein may be realized by reference to the remaining portions of the specification in the attached drawings.

DETAILED DESCRIPTION OF THE INVENTION

Figure 1:
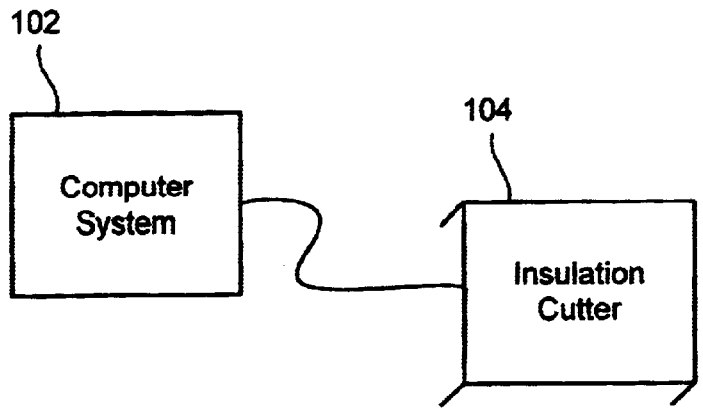
FIG. 1 illustrates a system for cutting insulation according to one embodiment.

FIG. 1 illustrates an insulation cutting system 100 for cutting insulation according to one embodiment. Insulation cutting system 100 includes a computer system 102 and an insulation cutter 104.

Computer system 102 may be any computing system for processing metal blanks and insulation blanks. It will be understood that computer system 102 may include separate systems for processing insulation and metal blanks or be the same system. Computer system 102 may be, for example, a personal computer, work station, handheld computer, etc. Computer system 102 may also include devices for entering information, such as a keyboard, scanner, voice recognition system, etc.

Insulation cutter 104 may be any system capable of cutting insulation blanks corresponding to the metal blanks. For example, insulation cutting system 104 is a table that includes insulation to be cut and a waterjet to cut the insulation. It will be understood that a person skilled in the art will appreciate that other methods of cutting insulation may be used, such as using a knife blade. In another embodiment, insulation cutter 104 may be replaced with any machine capable of producing other parts for the metal blanks. For example, other items needed to complete a fitting, such as joints, reinforcing, vanes, vane runners, etc. The process of producing other parts will be described hereinafter.

Computer system 102 and insulation cutter 104 are configured to optimize the processing of a batch of insulation blanks where the least amount of insulation is wasted for the batch. For example, insulation blanks may be of different sizes and the blanks are arranged where as little insulation is wasted as possible.

Computer system 102 receives a command to process one or more fittings for a job. One or more corresponding metal blanks are generated for one or more fittings. In order to generate the metal blanks, computer system 102 receives or includes information, such as the shapes and sizes for the metal blanks, that is needed to generate the metal blanks. The information is then sent to a metal blank cutting system (not shown) and all the metal blanks are processed and cut as a batch. The metal blanks are processed together and are arranged in a manner where the cutting of the metal blanks are optimized. The shapes and sizes of the metal blanks may be matched together where as little metal for the blanks is wasted as possible.

Identification information is assigned to the metal blanks in the batch and stored in computer system 102. This information is used after the metal blanks have been fabricated through a shop, where they are rolled, bent, and/or have seams and joints applied. The identification information is sufficient to identify the metal blank after fabrication. For example, the identification is a barcode on the metal blank, an ID number on the metal blank, etc.

After fabrication, the metal blanks are ready for insulation. However, the metal blanks are not always finished with fabrication at the same time. Furthermore, installation times of fabricated metal blanks vary. Thus, insulation is not needed at the same time for all the metal blanks that were processed in one batch. Accordingly, insulation may be cut only when one or more fabricated metal blanks are ready for installation.

When the fabricated metal blanks are ready for insulation, identification information for the ready fabricated metal blanks is inputted into computer system 102. Computer system 102 then sends the information to insulation cutting system 104, where the insulation blanks for only the ready fabricated metal blanks are optimized and cut.

Figure 2:
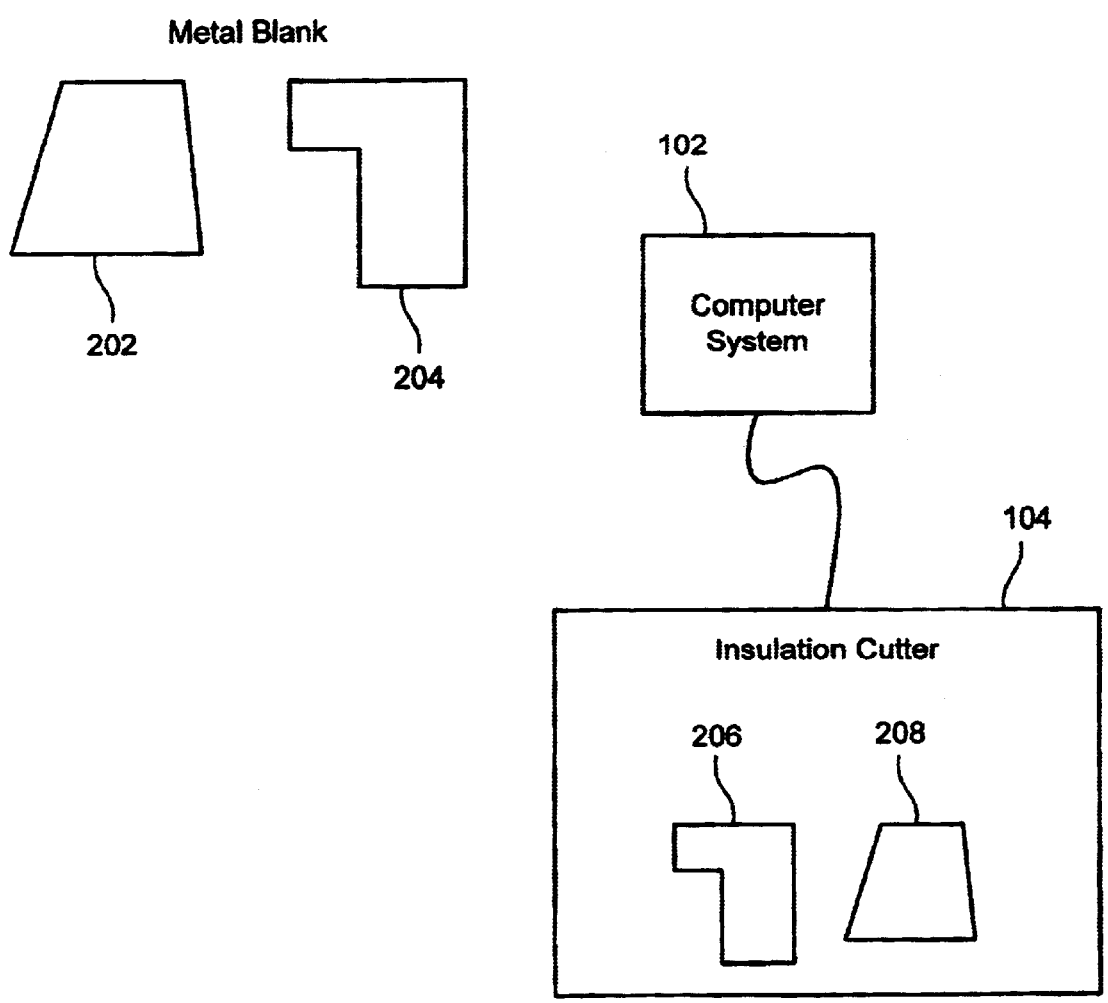
FIG. 2 illustrates a process of cutting insulation blanks using the system of FIG. 1.

FIG. 2 illustrates a process of cutting insulation blanks using system 100. After all of the metal blanks have been cut in one batch, the metal blanks are fabricated. For discussion purposes, it is assumed that two fabricated metal blanks of the batch are ready for insulation. However, it will be understood that any number of fabricated metal blanks may be ready for insulation. The fabricated metal blanks correspond to metal blank 202 and metal blank 204. When metal blank 202 and metal blank 204 were first processed, identifiers were assigned to both blanks in computer system 102. The identifiers of metal blanks 202 and 204 are then entered into computer system 102 to begin the insulation cutting process.

Computer system 102 optimizes the processing of insulation blanks for metal blanks 202 and 204. For example, insulation blanks 206 and 208 are arranged and cut on insulation cutting system 104 in the manner shown. Newly cut insulation blanks 206 and 208 may then be matched to corresponding metal blanks 202 and 204. In one embodiment, insulation blanks 206 and 208 may include the identification information that was inputted into computer system 102. For example, a bar code or identification number is included on insulation blanks 206 and 208. Insulation blanks 206 and 208 are then easily identified. Insulation blanks 206 and 208 may then be installed with fabricated metal blanks 202 and 204. Because the insulation blanks for only the metal blanks that are ready are processed, sorting and handling costs of the insulation blanks are greatly reduced or eliminated.

Although insulation blanks 206 and 208 are optimized for processing, the process may waste more insulation than typical approaches where all insulation blanks are cut when all the metal blanks are cut. However, as discussed above, insulation blanks must be searched for and matched to metal blanks after the metal blanks are fabricated. This requires expensive labor hours. In embodiments of the present invention, insulation blanks are cut after one or more metal blanks have been fabricated and are ready for insulation. The insulation is then installed with the fabricated metal blank. Thus, searching through a pile of pre-cut insulation is not necessary because insulation is cut on demand when needed. Labor costs are therefore avoided. Additionally, the increased waste of insulation caused by cutting insulation after fabrication is minimal because insulation is a relatively inexpensive material and the amount wasted in comparison to cutting all the insulation blanks at once with the metal blanks is negligible. Also, the labor costs involved in searching for the pre-cut insulation blanks costs more than what the wasted insulation is worth.

In another embodiment, a process for producing parts for metal blanks on demand is provided. System 100 may be used; however, insulation cutter 104 either is capable of producing the parts or is replaced by a machine that is capable of producing the parts. The process proceeds as described above where a batch of metal blanks are cut with identifications assigned to them. The metal blanks are then fabricated. In addition to needing insulation, the fabricated metal blanks may also require other parts, such as joints, reinforcing, vanes, vane runners, etc. A person of skill in the art will also appreciate other parts that may be used with metal blanks or fittings for duct work.

When the fabricated metal blanks are ready for the other parts, the identification numbers for the ready fabricated metal blanks are inputted into computer system 102. The other parts are then produced by the machine capable of producing the parts. Thus, the other parts are also produced on demand as opposed to producing all parts for an entire batch of metal blanks when the metal blanks are cut.

The above description is illustrative but not restrictive. Many variations of the invention will become apparent to those skilled in the art upon review of this disclosure. For example, other items may be produced on demand using methods and system of embodiments of the present invention, such as other items needed to complete a fitting assembly, which include joints, reinforcing, vanes, vane runners, etc. The scope of the invention should, therefore, be determined not with reference to the above description, but instead should be determined with reference to the pending claims along with their full scope or equivalents.

What is claimed is:

1. A method for cutting insulation for fabricated metal blanks using an insulation cutting system, the fabricated metal blanks being processed from a batch of metal blanks, the method comprising:

assigning one or more identifiers to metal blanks in the batch of metal blanks;

as one or more metal blanks in the batch of metal blanks are fabricated and ready for insulation, providing the identifiers for the metal blanks corresponding to the one or more fabricated metal blanks to the insulation cutting system; and cutting one or more insulation blanks for the identifiers of the metal blanks, the one or more insulation blanks corresponding to the one or more fabricated metal blanks.

2. The method of claim 1, wherein cutting the one or more insulation blanks comprises arranging the one or more insulation blanks where the one or more blanks are cut in an optimized manner.

3. The method of claim 1, wherein cutting the one or more insulation blanks comprises cutting the one or more insulation blanks in shapes to fit the one or more fabricated metal blanks.

4. The method of claim 1, wherein assigning one or more identifiers to the metal blanks comprises assigning bar codes to the metal blanks.

5. The method of claim 1, wherein assigning one or more identifiers to the metal blanks comprises assigning identification numbers to the metal blanks.

6. The method of claim 1, wherein the insulation cutting system comprises a computer.

7. The method of claim 6, wherein providing the identifiers of the metal blanks corresponding to the one or more fabricated metal blanks to the insulation cutting system comprises entering the one or more identifiers into the computer.

8. The method of claim 1, wherein the insulation cutting system comprises a waterjet for cutting the one or more insulation blanks.

9. The method of claim 1, wherein the insulation cutting system comprises a knife blade for cutting the one or more insulation blanks.

10. The method of claim 1, wherein the fabricated metal blanks have been processed to a point where insulation can be immediately installed on them.

11. A method for cutting insulation, the method comprising:
   processing a batch of metal blanks;
   assigning identifiers to processed metal blanks in the batch of metal blanks;
   fabricating one or more metal blanks in the batch of metal blanks, wherein metal blanks in the batch of metal blanks are fabricated at different times; and
   when the insulation is needed for the one or more fabricated metal blanks, inputting identifiers for the metal blanks corresponding to the one or more fabricated metal blanks into an insulation cutting system; and
   cutting one or more insulation blanks for the identifiers of the metal blanks corresponding to the one or more fabricated metal blanks, the one or more insulation blanks corresponding to the one or more fabricated metal blanks.

12. The method of claim 11, wherein cutting the one or more insulation blanks comprises arranging the one or more insulation blanks where the one or more blanks are cut in an optimized manner.

13. The method of claim 11, wherein cutting the one or more insulation blanks comprises cutting the one or more insulation blanks in shapes to fit the one or more fabricated metal blanks.

14. The method of claim 11, wherein assigning one or more identifiers to the metal blanks comprises assigning bar codes to the metal blanks.

15. The method of claim 11, wherein assigning one or more identifiers to the metal blanks comprises assigning identification numbers to the metal blanks.

16. The method of claim 11, wherein the insulation cutting system comprises a computer.

17. The method of claim 16, wherein providing the identifiers of the metal blanks corresponding to the one or more fabricated metal blanks to the insulation cutting system comprises entering the one or more identifiers into the computer.

18. The method of claim 15, wherein the insulation cutting system comprises a waterjet for cutting the one or more insulation blanks.

19. The method of claim 11, wherein the insulation cutting system comprises a knife blade for cutting the one or more insulation blanks.

20. The method of claim 11, wherein fabricating the one or more metal blanks comprises processing the one or more metal blanks to a point where insulation can be immediately installed on them.

21. A system for cutting insulation for one or more fabricated metal blanks, the one or more fabricated metal blanks being processed from a batch of metal blanks, the system comprising:
   a computer system configured to receive identifiers for the batch of metal blanks;
   an insulation cutter configured to cut insulation blanks, wherein the computer system sends one or more identifiers for metal blanks corresponding to one or more fabricated metal blanks to the insulation cutter when the fabricated metal blanks are ready for insulation to be installed and the insulation cutter cuts one or more insulation blanks corresponding to the one or more identifiers of the one or more fabricated metal blanks.

22. The system of claim 21, wherein the insulation cutter comprises a waterjet for cutting the one or more insulation blanks.

23. The system of claim 21, wherein the insulation cutter comprises a knife blade for cutting the one or more insulation blanks.

24. The system of claim 21, wherein the fabricated metal blanks are fittings for duct work.

25. The system of claim 21, wherein the identifiers comprise bar codes.

26. The system of claim 21, wherein the identifiers comprise identification numbers.

27. The system of claim 21, wherein the fabricated metal blanks have been processed to a point where insulation can be immediately installed on them.

28. A method for producing parts for fabricated metal blanks using a machine, the fabricated metal blanks being processed from a batch of metal blanks, the method comprising:
   assigning one or more identifiers to metal blanks in the batch of metal blanks;
   as one or more metal blanks in the batch of metal blanks are fabricated and ready for one or more parts to be installed, providing the identifiers of the metal blanks corresponding to the one or more fabricated metal blanks to the machine; and
   producing one or more parts for the identifiers of the metal blanks, the one or more parts being installable on the one or more fabricated metal blanks.

29. The method of claim 28, wherein the parts comprise at least one of joints, reinforcing, vanes, and vane runners.

30. The method of claim 28, wherein the parts comprise parts for fittings for duct work.

31. The method of claim 28, wherein the fabricated metal blanks have been processed to a point where the one or more additional parts can be immediately installed on them.

32. A method for cutting insulation on demand for a batch of metal blanks using an insulation cutting system, the method comprising:
   (a) assigning identifiers to each metal blank in the batch of metal blanks;
   (b) when it is determined that insulation is desired for a subset of metal blanks in the batch of metal blanks, providing the identifiers for the subset of metal blanks to the insulation cutting system; and
   (c) cutting one or more insulation blanks for the identifiers of the subset of metal blanks, the one or more insulation blanks corresponding to the subset of metal blanks;
   (d) repeating steps (b) and (c) with a new subset of metal blanks in the batch of metal blanks, wherein insulation is cut on demand for the new subset of metal blanks and the subset of metal blanks.

33. The method of claim 32, wherein when insulation is desired comprises when insulation can be installed on metal blanks in the subset of metal blanks.

34. The method of claim 33, further comprising:
   fabricating the subset or new subset of metal blanks; and
   installing the cut insulation blanks on the fabricated subset or new subset of metal blanks, wherein insulation is cut and installed at different times for the fabricated subset and new subset of metal blanks.

35. The method of claim 32, wherein insulation is cut for the new subset of metal blanks at a different time than the subset of metal blanks.

* * * * *